United States Patent [19]

Zison et al.

[11] 4,438,883

[45] Mar. 27, 1984

[54] DYNAMIC PRESSURE ATTENUATOR AND METHOD

[75] Inventors: Stanley W. Zison, Irvine; Robert N. Turer, Long Beach, both of Calif.

[73] Assignee: Getty Synthetic Fuels, Inc., Signal Hill, Calif.

[21] Appl. No.: 410,333

[22] Filed: Aug. 23, 1982

[51] Int. Cl.$^3$ ............................................. B05B 1/14
[52] U.S. Cl. ............................ 239/553.3; 239/553.5; 239/557
[58] Field of Search ............... 239/548, 553, 553.3, 239/553.5, 556, 557; 98/71, 82, 79

[56] References Cited

U.S. PATENT DOCUMENTS

| | | |
|---|---|---|
| 2,090,392 | 8/1937 | Meuth . |
| 2,284,147 | 5/1942 | Herrick . |
| 2,701,999 | 2/1955 | Moran . |
| 2,878,744 | 3/1959 | Silverman . |
| 3,034,353 | 5/1962 | Anderson . |
| 3,168,861 | 2/1965 | Miller . |
| 3,214,115 | 10/1965 | Price . |
| 3,231,004 | 1/1966 | Reed et al. . |
| 3,310,257 | 3/1967 | Price . |
| 3,318,146 | 5/1967 | De Leo et al. . |
| 3,610,538 | 10/1971 | Enders .............................. 239/533.3 |

Primary Examiner—John J. Love
Assistant Examiner—Paul A. Sobel
Attorney, Agent, or Firm—Gordon L. Peterson

[57] ABSTRACT

A dynamic pressure attenuator comprising a housing and a plurality of tubes extending through the interior of the housing and defining wind passages. Each of the tubes has a plurality of radially extending ports. The housing has an inlet to admit a gas to the interior of the housing. When wind passes through the wind passages, the static pressure in the ports is substantially normal ambient static pressure and the dynamic pressure in the ports is essentially zero. Gas from the inlet passes through the ports and the wind passages to the atmosphere.

24 Claims, 4 Drawing Figures

DYNAMIC PRESSURE ATTENUATOR AND METHOD

BACKGROUND OF THE INVENTION

It is sometimes necessary or desirable to discharge a gas to the atmosphere while shielding the gas conducting system from the dynamic pressure of the wind. For example, in making field measurements of gas flow, it may be necessary to discharge the gas to the atmosphere. In this instance, it is necessary to shield the flow meter from the dynamic pressure of the wind. If this is not done, the accuracy of the measurements may be greatly reduced.

Various attempts have been made to provide some degree of isolation of a system from the dynamic pressure affects of the wind. For example, Silverman U.S. Pat. No. 2,878,744, Moran U.S. Pat. No. 2,701,999, Mueth U.S. Pat. No. 2,090,392, Reed et al U.S. Pat. No. 3,231,004 and Miller U.S. Pat. No. 3,168,861 deal with systems to provide draft control or protection for heaters or vents, and Herick U.S. Pat. No. 2,284,147 provides an apparatus for preventing rain or foreign materials from entering the upper end of a pipe. Price U.S. Pat. Nos. 3,310,257 and 3,214,115 and DeLeo et al U.S. Pat. No. 3,318,146 provide apparatuses for pressure measurement for aircraft usage. Anderson U.S. Pat. No. 3,034,353 provides a static pressure probe which is said to provide the same static reading regardless of its orientation. None of the approaches discussed above provide the degree of shielding which is desired for some of the more pressure sensitive gas supply systems.

SUMMARY OF THE INVENTION

This invention provides a dynamic pressure attenuator which provides substantial shielding of a gas supply system from the dynamic pressure of the wind. With this invention, even very pressure-sensitive gas supply systems can discharge gas to the atmosphere without substantially adversely affecting the gas supply system.

The dynamic pressure attenuator of this invention includes a housing having an inlet through which gas under some positive pressure can enter the housing from the gas supplying or conducting system. Means is provided for creating a static pressure zone within the housing which is substantially at normal ambient static pressure. The interior of the housing communicates with the atmosphere through the zone which is maintained substantially at normal ambient static pressure, i.e., the static pressure that would exist under zero wind conditions. Accordingly, the gas within the housing, which is under some positive pressure can flow through this zone of substantially normal ambient static pressure and be discharged to the atmosphere.

This can be advantageously implemented by providing wall means defining a plurality of wind passages extending through the interior of the housing, with the wind passages being open to allow the wind to pass therethrough. The wall means, which can advantageously include a plurality of tubes, has ports extending through the wall means to provide communication between the interior of the housing and at least some of the wind passages. Accordingly, when wind passes through the wind passages, the dynamic pressure in the housing outside the wind passages is much less than the dynamic pressure in the wind passages having wind passing therethrough. Thus, the gas at the inlet is shielded from the high dynamic pressure and can flow through at least some of these ports and the associated wind passages to the atmosphere.

Although the wind passages could extend in the same direction, preferably the wind passages extend at least in two or three different directions. In a preferred construction, there are three groups of the wind passages, and they extend through the housing in three different directions, respectively, with each of the directions being transverse to the other of the directions. Preferably, the wind passages are oriented to provide substantial symmetry.

Although each of the wind passages could be curved or extend in multiple directions, preferably each of the wind passages in linear. If a wind passage had a curve or bend, it would increase the likelihood that wind passing through such wind passage would enter the interior of the housing through the ports and increase the pressure within the housing. Accordingly, for optimum results, each of the wind passages preferably extends linearly and the ports extend radially of the associated wind passage to minimize the likelihood of air flowing from the wind passages through the ports through the interior of the housing.

To provide the gas within the interior of the housing with a maximum opportunity to enter the wind passages, each of the tubes preferably has a plurality of the ports distributed axially and circumferentially along the tube. The total area of the ports for each of the tubes is preferably large relative to the cross-sectional area of the wind passage of the associated tube. Preferably for flow measurement applications, the total port area is five to ten times the cross-sectional area of the associated wind passage and the total wind passage cross sectional area is at least three times the cross sectional area of the inlet to the housing through which gas is supplied. For pressure measurement applications, these area ratios are unimportant.

Preferably, each of the wind passages is of uniform cross sectional area and uniform configuration throughout its full length. To minimize turbulence, the wind passages preferably are non-intersecting and each of the wind passages preferably has a smooth interior wall.

A porous packing is preferably provided within the interior of the housing and outside of the wind passages. The porous packing serves to attenuate any high frequency dynamic pressure surges that may occur within the housing due to rapid changes in wind speed or direction.

Although the housing can be of various different configurations, a housing which comprises a plurality of plate-like walls is preferred. Although a spherical housing is theoretically the optimum configuration, symmetry with respect to the wind passages cannot be obtained with a spherical housing causing the wind passages to intersect. When the housing is constructed of plate-like walls, at least some of the wind passages extend between the walls.

In a preferred construction, the housing has six generally plate-like walls defining, respectively, six sides of the housing. The three groups of tubes extend, respectively, between the three opposite sides of the housing. With this construction, some wind will pass through some of the wind passages regardless of the direction in which the wind is blowing.

The inlet to the housing through which gas is supplied can take many different forms. However, in a preferred construction, the inlet is formed by a conduit which extends into the interior of the housing and has an open end at a central portion of the housing. By discharging the gas at the central portion of the housing, changes in direction of the wind are less likely to influence flow through the ports and into the wind passages. The attenuator preferably imposes no more than negligible back pressure on the gas supply system.

The invention, together with additional features and advantages thereof, may best be understood by reference to the following description taken in connection with the accompanying illustrative drawing.

BRIEF DESCRIPTION OF THE DRAWING

FIG. 4 is an enlarged fragmentary sectional view taken generally along line 4—4 of FIG. 2.

DESCRIPTION OF THE PREFERRED EMBODIMENT

Figure 1:
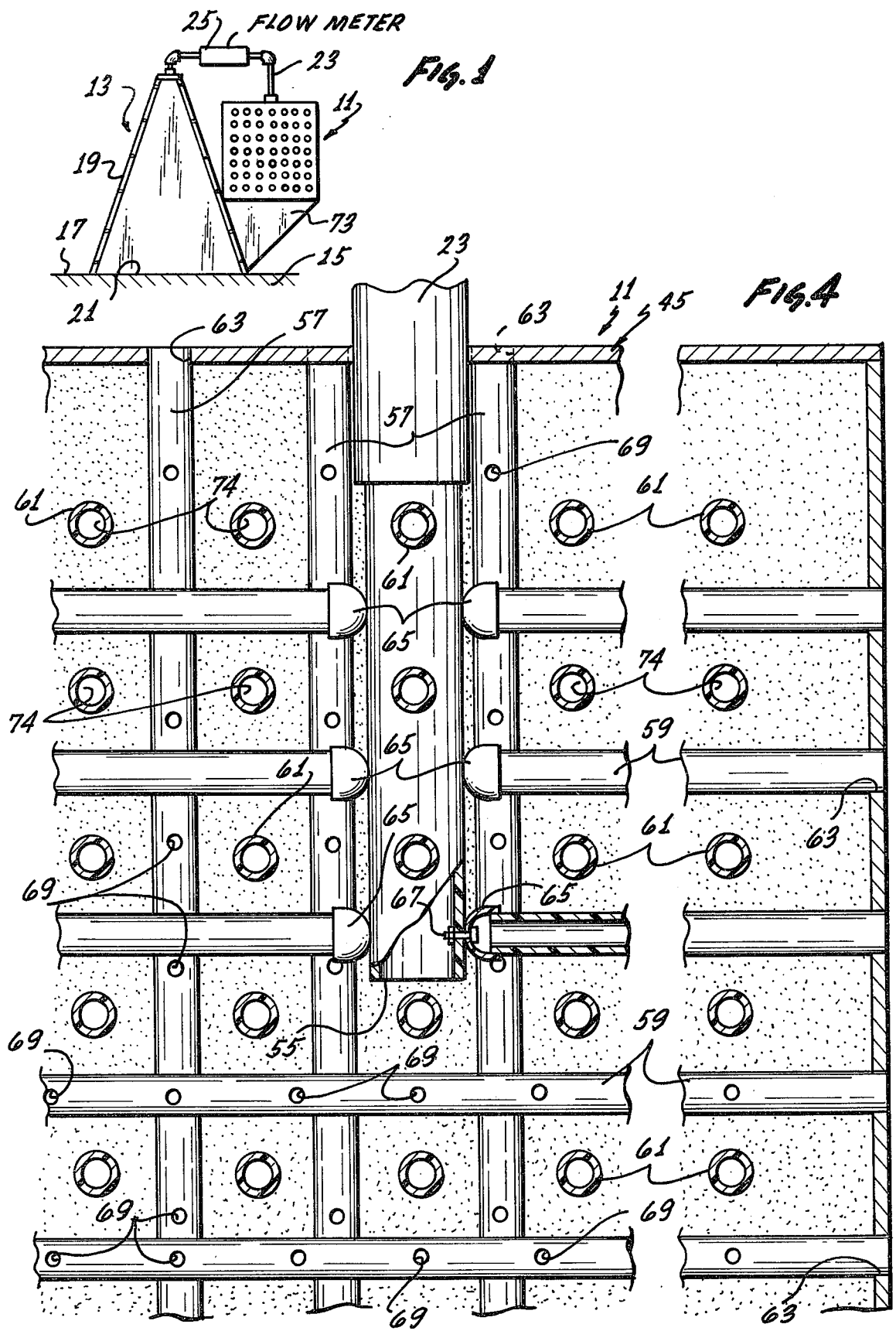
FIG. 1 is an elevational view of one form of the dynamic pressure attenuator of this invention, and one example of gas supply system with which this invention may be used.

FIG. 1 shows a dynamic pressure attenuator 11 coupled to receive gas from a gas supply system 13. Although the pressure attenuator 11 is usable with gas supply systems of various different constructions and purposes, the system 13 collects landfill gas which is produced by a landfill 5 and vents through an upper surface 17 of the landfill. A portion of the venting landfill gas is collected by a receiver 19 which rests on the surface 17 and which has an open bottom 21.

The landfill gas produced by the landfill is inherently under a positive pressure, and this positive pressure drives the landfill gas upwardly through the receiver 19 and a conduit 23 to the dynamic pressure attenuator 11. In flowing from the receiver 19 to the pressure attenuator 11, the landfill gas flows through a flow meter 25, such as a bubble flow meter, which measures the flow rate and/or mass flow of the landfill gas.

After this measurement has been taken, it is desired to discharge the landfill gas to the atmosphere but it is important to do this while isolating the flow meter and the interior of the receiver 19 from the dynamic pressure due to wind. If the flow meter 25 were exposed to the dynamic pressure of the wind, it may be impossible to obtain any reading because the quantity of gas passing through the flow meter is very small, and it is under a very small pressure head. Similarly, if the interior of the receiver 19 were subjected to dynamic pressure from the wind, the venting rate of the landfill gas into the receiver 19 could be drastically altered. As the purpose of the system 13 is to measure the venting rate of the landfill gas from the region of the landfill exposed to the interior of the receiver, it is apparent that the discharge of the landfill gas to the atmosphere must be accomplished without subjecting various components of the system 13 to the dynamic pressure of the wind. A system of the type shown in FIG. 1 for measuring the venting rate of gases, such as landfill gases, is described in common assignee's co-pending application Ser. No. 410,331 entitled Method and Apparatus for Determining the Venting Rate of Landfill Gas filed on even data herewith and naming Stanley W. Zison as the sole inventor.

Figure 2:
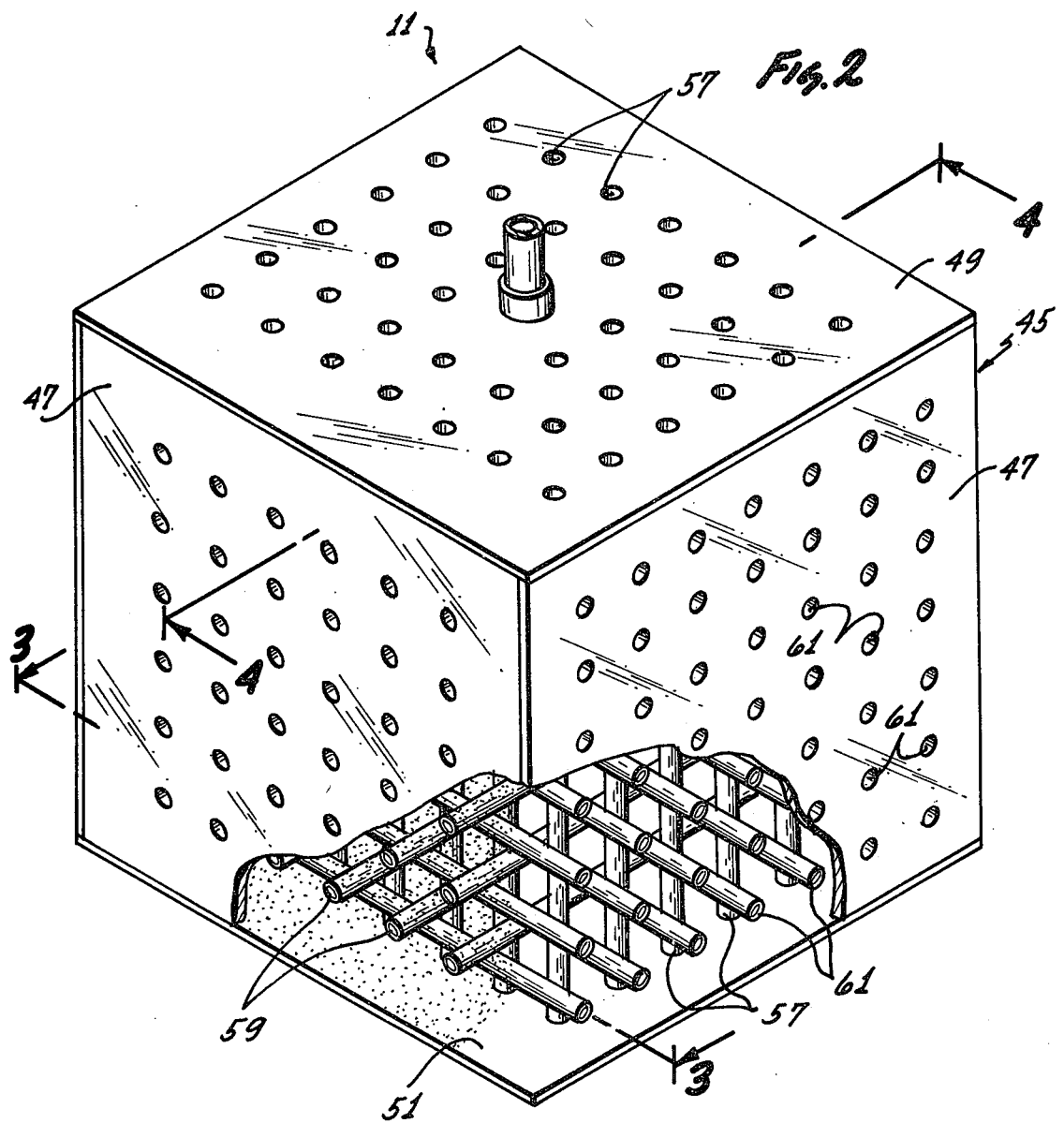
FIG. 2 is a perspective view of the attenuator with portions of the wall and porous packing broken away to show the interior of the housing.
Figure 3:
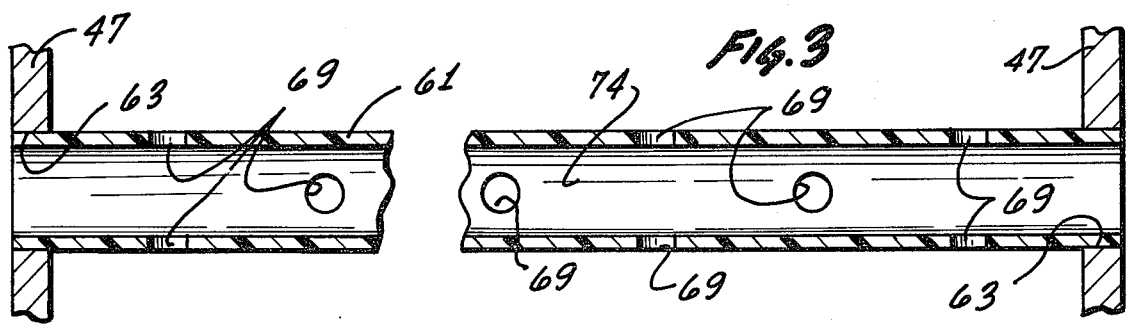
FIG. 3 is an enlarged sectional view taken generally along line 3—3 of FIG. 2.

A preferred form of the dynamic pressure attenuator 11 is known in FIGS. 2-4. This form of pressure attenuator 11 includes a housing 45 which, in the embodiment illustrated, is in the form of a cube formed by four planar side walls 47 (only two being shown in FIG. 2), a top wall 49, and a bottom wall 51, all of which are suitably interconnected to form the cubic housing 45. Of course, the housing can be used in any desired orientation so the top wall 49 need not be the uppermost wall. By way of example, the walls 47, 49 and 51 may be constructed of a suitable plastic, and the conduit 23 is attached to the top wall 49 in any suitable manner, such as by a coupling 53 bonded to the top wall. As shown in FIG. 4, the conduit 23 extends into the interior of the housing 45 and terminates in an open end or housing inlet 55 which preferably lies near the geometrical center of the housing 45. Thus, the gas collected by the receiver 19 flows through the conduit 23 and the flow meter 25 to the interior of the housing 45.

The pressure attenuator 11 also includes three series of conduits or tubes 57, 59 and 61. The tubes 57 extend parallel to each other between the top wall 49 and the bottom wall 51 and have their opposite ends releasably mounted within apertures 63 (FIG. 4) of the top and bottom walls. Thus, the tubes 57 extend generally parallel to the portion of the conduit 23 within the housing 45.

The tubes 59 extend parallel to each other between one pair of opposite side walls 47 and the tubes 61 extend parallel to each other between the other set of opposite side walls 47. Except for certain of the tubes 59 and 61 which intersect the conduit 23 as shown in FIG. 4, these tubes have their ends mounted within apertures 63 of their respective plates and described above for the tubes 57. The tubes 59 and 61 which intersect the conduit 23 within the housing 45 have their inner ends received and mounted within cups 65, each of which is suitably attached to the conduit 23 as by a threaded fastener 67. When mounted in this fashion, the series of tubes 57, 59 and 61 is mutually transverse and would, except for the fact that they are non-intersecting, be mutually perpendicular.

As shown in FIGS. 2 and 4, the tubes 61 are arranged in a series of vertically spaced horizontal rows, and the tubes 59 are similarly arranged in vertically spaced horizontal rows, with the rows of tubes 59 being intermediate the rows of the tubes 61. The tubes 57 are arranged in horizontally spaced vertical rows, and the tubes 57 extend downwardly between the spaces provided by the tubes 59 and 61 to provide symmetry. Preferably, all of the tubes are substantially equally spaced from the adjacent tubes.

With the exception of a few of the tubes 59 and 61 which intersect the conduit 23 within the housing 45, each of the tubes 57, 59 and 61 contains a plurality of openings or ports 69 as shown in FIGS. 3 and 4. The ports 69 are distributed along the length of their respective tubes in several (four being illustrated) axially extending, circumferentially offset rows, with the axes of the ports extending radially of the associated tube. In the embodiment illustrated, the axially extending rows of the ports 69 are circumferentially offset from each other by 90 degrees.

By way of example, the tubes 57, 59 and 61 may nominally be ¾" schedule 40 PVC pipe, and the apertures 69 may be circular apertures with a ¼" diameter and a 2" center-to-center spacing along any given row of the apertures. By way of illustration, the center-to-center spacing between the tubes 57 may be 2¾", and the same spacing may be used between the tubes of the series of tubes 59 and 61. The tubes 59 and 61 which intersect the conduit 23 are imperforate and are not used for dynamic pressure attenuation. Rather, these tubes are essentially support members for the portion of the conduit 23 within the housing 45.

The attenuator 11 includes a porous packing 71 which is optional and which, except for the tubes 57, 59 and 61 and the conduit 23, substantially fills the interior of the housing 45. For example, the packing 71 may be fiberglass.

Although the attenuator 11 can be mounted remotely from the receiver 19, it can advantageously be mounted on brackets 73 (FIG. 1) attached to the receiver. Although the attenuator 11 can be mounted in different orientations, in the embodiment illustrated, the tubes 59 and 61 extend horizontally.

The purpose of the pressure attenuator is to shield the open end 55 of the conduit 23, as well as the system upstream from the open end 55 from the dynamic pressure due to wind while allowing gas from the conduit 23 to escape to the atmosphere. In use, the tubes 57, 59 and 61 provide smooth, cylindrical wind passages 74 which allow the wind to pass through these tubes regardless of the direction of the wind. As wind passes through any of these tubes, the wind creates a relatively high dynamic pressure within such tubes. However, because the axes of the ports are perpendicular to the direction of flow of the wind through the associated tube, the dynamic pressure in the housing outside the wind passages is greatly reduced and the static pressure in the ports 69 may be essentially zero gage. Thus, the open end 55 is effectively isolated from at least a large portion of the dynamic pressure created by the wind. Accordingly, the landfill gas exiting from the inlet 55 can flow under only a modest static pressure through the ports 69 and into the tubes 57, 59 and 61. The landfill gas then flows through these tubes and it is discharged to the atmosphere.

In use of the system 13, the receiver 19 is placed on the surface of the landfill 15, with a region of known area of the landfill surface being exposed within the receiver through the opening 29. If desired, dirt may be piled around the base of the receiver 19 to improve the seal around the receiver. As landfill gas vents from the region of the landfill which is exposed to the interior of the receiver 19, the landfill gas enters the receiver and flows upwardly under the modest positive pressure provided by the gas within the landfill. This same pressure drives the landfill gas through the bubble flow meter 25 so that the flow of the landfill gas, and hence the venting rate, can be determined.

The landfill gas is then forced through the conduit 23 and the inlet 55 into the interior of the housing 45. The attenuator 11 shields the discharging landfill gas from the dynamic pressure created by the wind as described above, and the landfill gas exits to the atmosphere through the ports 69 and the tubes 57–61. If desired, fence-like windshields (not shown) may be used to shield the attenuator 11 from the wind to provide additional attenuation.

Although an exemplary embodiment of the invention has been shown and described, many changes, modifications and substitutions may be made by one having ordinary skill in the art without necessarily departing from the spirit and scope of this invention.

We claim:

1. A dynamic pressure attenuator comprising:
   a housing;
   wall means defining a plurality of wind passages extending through the interior of said housing, said wind passages being open to allow the wind to pass therethrough;
   said wall means having a plurality of ports extending through the wall means and providing communication between the interior of the housing and at least some of said wind passages whereby when the wind passes through said wind passages, the dynamic pressure in said housing outside of said wind passages is substantially less than the dynamic pressure within said wind passages through which the wind is passing; and
   said housing having means for permitting a gas to be discharged into the interior of said housing whereby such gas can flow through at least some of said ports and associated wind passages to the atmosphere.

2. A dynamic pressure attenuator as defined in claim 1 wherein first and second of said wind passages extend through the housing in different directions.

3. A dynamic pressure attenuator as defined in claim 1 wherein first and second groups of said wind passages extend through the housing in different directions.

4. A dynamic pressure attenuator as defined in claim 1 wherein first, second and third groups of the wind passages extend through the housing in three directions, respectively, each of said directions being generally transverse to the other of said directions.

5. A dynamic pressure attenuator as defined in claim 1 including conduit means for discharging the gas into a central region of the housing.

6. A dynamic pressure attenuator as defined in claim 1 wherein said wall means includes a plurality of tubes extending across the interior of said housing and having at least some of said ports therein.

7. A dynamic pressure attenuator as defined in claim 6 wherein at least some of said ports have axes extending radially of their associated tubes.

8. A dynamic pressure attenuator as defined in claim 1 wherein said wall means includes a plurality of tubes and each of said tubes has a plurality of ports spaced longitudinally of said tube.

9. A dynamic pressure attenuator as defined in claim 8 wherein each of said tubes has a plurality of said ports spaced axially and circumferentially therealong.

10. A dynamic pressure attenuator as defined in claim 1 wherein said housing includes a plurality of plate-like walls and at least some of said wind passages extend between said plate-like walls.

11. A dynamic pressure attenuator as defined in claim 1 wherein said housing has six generally plate-like walls defining, respectively, six sides of the housing, said wall means includes first, second and third groups of tubes extending, respectively, between the three opposite sides of the housing, at least some of said tubes having at least some of said ports therein, at least some of said ports having axes extending generally radially of their associated tubes.

12. A dynamic pressure attenuator as defined in claim 11 wherein each of said tubes which has ports therein has the ports thereof distributed along the length and circumference of such tube and said attenuator includes conduit means for discharging the gas into a central region of the housing on the outside of all of said tubes.

13. A dynamic pressure attenuator as defined in claim 1 including a porous packing within said housing and outside of said wall means.

14. A dynamic pressure attenuator comprising:
a housing;
a plurality of tubes extending through the interior of said housing, said tubes being open to define wind passages extending through the housing;
at least some of said tubes having ports extending through the wall of the tube to provide communication between the interior of the housing and at least some of the wind passages; and
means defining an inlet to said housing whereby said inlet communicates with said wind passages through the interior of said housing and said ports.

15. A dynamic pressure attenuator as defined in claim 14 wherein first and second groups of said wind passages extend through the housing in different directions.

16. A dynamic pressure attenuator as defined in claim 14 including first, second and third groups of the wind passages extending through the housing in three directions, respectively, each of said directions being generally transverse to the other of said directions.

17. A dynamic pressure attenuator as defined in claim 14 wherein at least some of said wind passages extend generally linearly through said housing.

18. A dynamic pressure attenuator as defined in claim 14 wherein at least some of said tubes have the ports therein distributed axially and circumferentially along such tubes.

19. A dynamic pressure attenuator as defined in claim 14 including a porous packing within said housing and substantially out of said wind passages.

20. A dynamic pressure attenuator as defined in claim 14 wherein each of said wind passages of a group of said wind passages is of uniform cross-sectional area and configuration throughout its full length.

21. A dynamic pressure attenuator as defined in claim 20 wherein each of said wind passages of said group extends linearly through the housing without intersecting another of said wind passages.

22. A method of discharging gas from a gas supply system to the atmosphere while shielding the gas supply system from the dynamic pressure of the wind comprising:
providing a housing and wall means defining a plurality of wind passages extending through the interior of the housing with the wall means having a plurality of ports extending therethrough and providing communication between the interior of the housing and at least some of the wind passages;
exposing the housing to an environment where it is subjected to wind;
allowing the wind to pass through the wind passages with the static pressure at said ports of the wind passages having the wind passing therethrough being substantially at normal ambient static pressure; and
introducing gas under a positive pressure to the interior of the housing whereby the gas can pass through at least some of the ports and the associated wind passages to the atmosphere.

23. A method as defined in claim 22 wherein said gas is landfill gas.

24. A method as defined in claim 22 wherein said step of introducing includes introducing the gas to a central region of the interior of the housing.

* * * * *